United States Patent
Anchan et al.

(10) Patent No.: US 9,025,498 B2
(45) Date of Patent: May 5, 2015

(54) APPLICATION LAYER ACCESS CHANNEL CONGESTION AVOIDANCE IN GROUP COMMUNICATIONS OVER BROADCAST/MULTICAST SERVICES

(71) Applicant: QUALCOMM Incorporated, San Diego, CA (US)

(72) Inventors: Kirankumar Anchan, San Diego, CA (US); Yih-Hao Lin, San Diego, CA (US); Mark A. Maggenti, San Diego, CA (US); Arvind V. Santhanam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 92 days.

(21) Appl. No.: 13/726,605

(22) Filed: Dec. 25, 2012

(65) Prior Publication Data
US 2013/0170352 A1 Jul. 4, 2013

Related U.S. Application Data

(60) Provisional application No. 61/581,028, filed on Dec. 28, 2011.

(51) Int. Cl.
*H04L 12/16* (2006.01)
*H04W 28/02* (2009.01)
*H04L 12/18* (2006.01)
*H04W 76/00* (2009.01)
*H04W 68/00* (2009.01)

(52) U.S. Cl.
CPC ....... *H04W 28/0289* (2013.01); *H04L 12/1868* (2013.01); *H04W 76/002* (2013.01); *H04L 12/1881* (2013.01); *H04W 68/00* (2013.01); *H04L 12/189* (2013.01)

(58) Field of Classification Search
USPC ................ 370/259, 260, 261, 395.42, 395.4, 370/395.41, 395.21, 352, 389, 338, 328
See application file for complete search history.

(56) References Cited

U.S. PATENT DOCUMENTS

| | | | |
|---|---|---|---|
| 7,660,327 B2 | 2/2010 | Katar et al. | |
| 7,672,327 B2 | 3/2010 | Kall et al. | |
| 8,023,440 B2 | 9/2011 | Nass et al. | |
| 2004/0233927 A1 | 11/2004 | Kirosawa | |
| 2009/0080355 A1 | 3/2009 | Song | |
| 2010/0016008 A1* | 1/2010 | Brewer et al. | 455/518 |
| 2010/0069037 A1 | 3/2010 | Fischer et al. | |
| 2011/0010446 A1 | 1/2011 | Chen et al. | |
| 2012/0063305 A1* | 3/2012 | Chiu et al. | 370/230 |

OTHER PUBLICATIONS

International Search Report and Written Opinion—PCT/US2012/071665—ISA/EPO—Feb. 5, 2013.

(Continued)

*Primary Examiner* — Dady Chery
(74) *Attorney, Agent, or Firm* — Michael F. Taveira

(57) ABSTRACT

The disclosure is directed to prioritizing call announce response in a broadcast/multicast communication system. An embodiment establishes a first priority for response based on assigning each user equipment (UE) a first random delay for response to a first call announce, responds to the first call announce using the first random delay, and determines a second priority for response to a subsequent call announce based on an elapsed time that each UE is present in a multicast area.

32 Claims, 11 Drawing Sheets

(56) References Cited

OTHER PUBLICATIONS

Nokia: "Optimizing the signaling load for MBMS counting", 3GPP Draft; CI-070252 CR1123__24008__Service__Request__MBMS, 3rd Generation Partnership Project (3GPP), Mobile Competence Centre ; 650, Route Des Lucioles ; F-06921 Sophia-Antipolis Cedex ; France, vol . CT WG1, no. Vancouver, Canada; 20070129, Jan. 29, 2007, XP050024538.

* cited by examiner

APPLICATION LAYER ACCESS CHANNEL CONGESTION AVOIDANCE IN GROUP COMMUNICATIONS OVER BROADCAST/MULTICAST SERVICES

CLAIM OF PRIORITY

The present Application for Patent claims priority to Provisional Patent Application No. 61/581,028 entitled "APPLICATION LAYER ACCESS CHANNEL CONGESTION AVOIDANCE IN GROUP COMMUNICATIONS OVER BROADCAST/MULTICAST SERVICES," filed Dec. 28, 2011, and assigned to the assignee hereof and hereby expressly incorporated by reference herein in its entirety.

FIELD OF DISCLOSURE

The present disclosure relates generally to communication, and more specifically to techniques for supporting group communications on broadcast and multicast services in a wireless communication system.

BACKGROUND

A cellular or wireless communication system can support bi-directional communication for multiple users by sharing the available system resources. Cellular systems are different from broadcast systems that can mainly or only support uni-directional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using either unicast, broadcast, multicast or a combination of each. As the group becomes larger it is generally more efficient to use multicast services. However, for group communication services that require low latency and a short time to establish the group communication, the setup time of conventional multicast channels can be a detriment to system performance.

Additionally, broadcast/multicast services, such as LTE eMBMS does not offer a mechanism to support access channel congestion avoidance and ACK/uplink TCH suppression for UEs multicast applications. Accordingly, in a high density group call, there will be many responders contending for the same access slots, which can lead to excessive collisions and delays due to the collisions on the reverse link common access channel.

SUMMARY

The disclosure is directed to prioritizing call announce response in a broadcast/multicast communication system. An embodiment establishes a first priority for response based on assigning each user equipment (UE) a first random delay for response to a first call announce, responds to the first call announce using the first random delay, and determines a second priority for response to a subsequent call announce based on an elapsed time that each UE is present in a multicast area.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
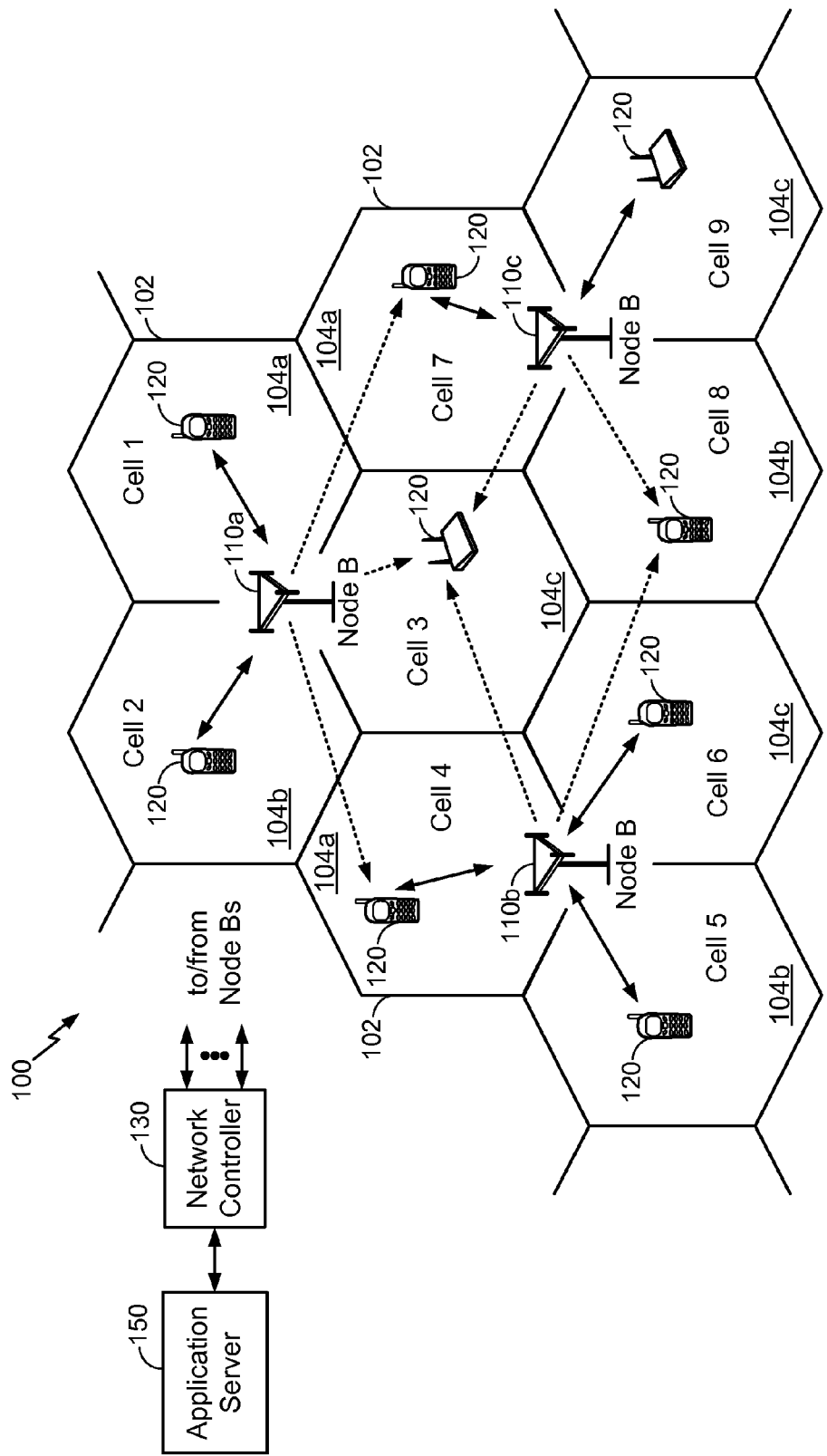
FIG. 1 illustrates a wireless communication system.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Further, as used herein the term group communication, push-to-talk, or similar variations are meant to refer to a server arbitrated service between two or more devices.

The terminology used herein is for the purpose of describing particular embodiments only and is not intended to be limiting of embodiments of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE and GSM are described in documents from an organization named "3rd Generation Partnership Project" (3GPP). Cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system. System 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

Network controller 130 may couple to multiple Node Bs to provide coordination and control for the Node Bs under its control, and to route data for terminals served by these Node Bs. Access network 100 may also include other network entities not shown in FIG. 1. Further, as illustrated network controller may be operably coupled to an application server 150 to provide group communication services to the various UEs 120 through access network 100. It will be appreciated that there can be many other network and system entities that can be used to facilitate communications between the UEs and servers and information outside of the access network. Accordingly, the various embodiments disclosed herein are not limited to the specific arrangement or elements detailed in the various figures.

Figure 2:
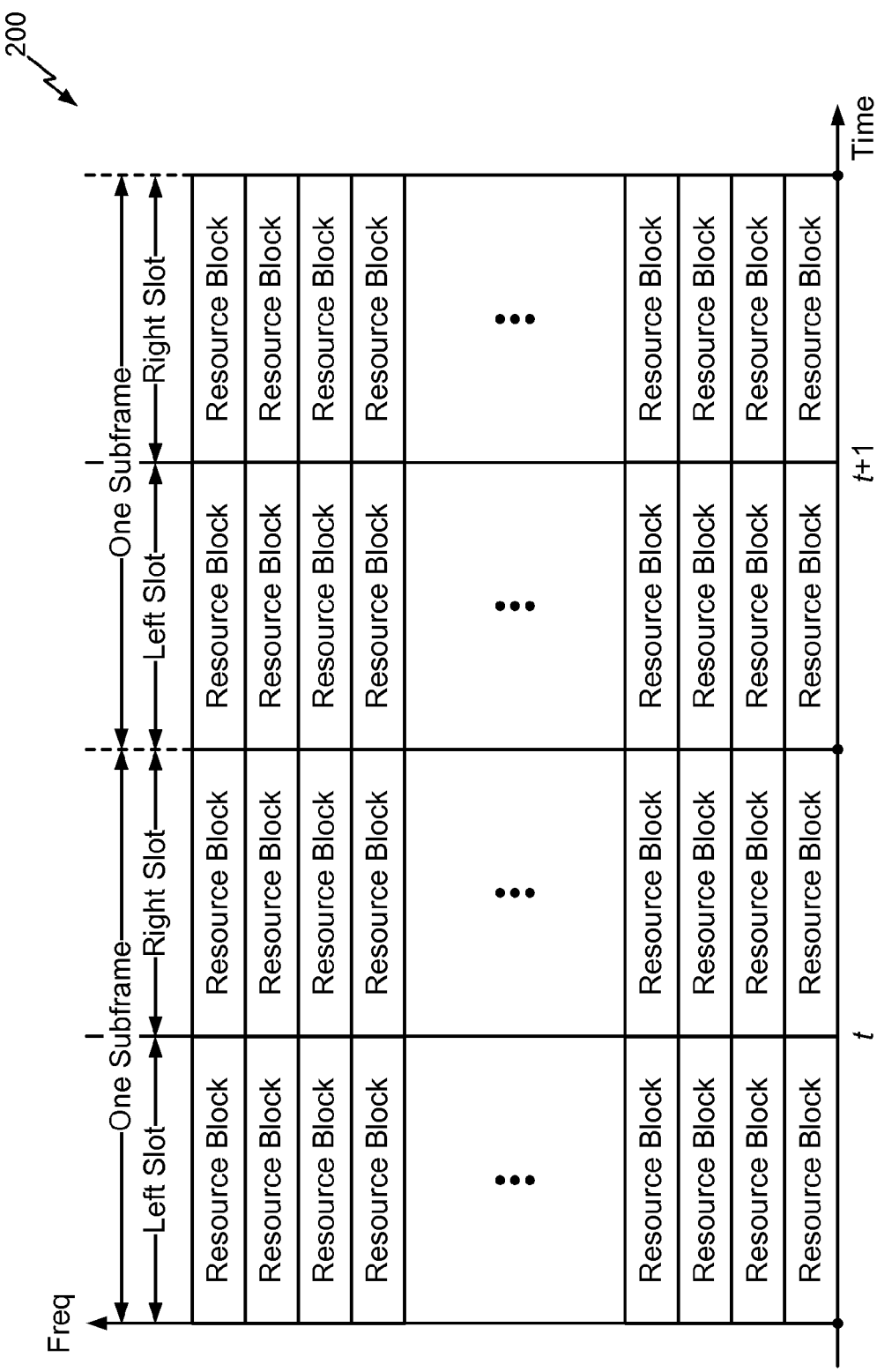
FIG. 2 illustrates an example transmission structure.

FIG. 2 shows an example transmission structure 200 that may be used for the downlink in system 100. The transmission timeline may be partitioned into units of radio frames. Each radio frame may have a predetermined duration (e.g., 10 milliseconds (ms)) and may be partitioned into 10 sub frames. Each sub frame may include two slots, and each slot may include a fixed or configurable number of symbol periods, e.g., six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (eMBMS or E-MBMS) for multiple UEs as well as unicast services for individual UEs. A service for eMBMS may be referred to as an eMBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
| --- | --- | --- | --- |
| Broadcast Control Channel | BCCH | L | Carry system information |
| Broadcast Channel | BCH | T | Carry master system Information |
| eMBMS Traffic Channel | MTCH | L | Carry configuration information for eMBMS services. |
| Multicast Channel | MCH | T | Carry the MTCH and MCCH |
| Downlink Shared Channel | DL-SCH | T | Carry the MTCH and other logical channels |

TABLE 1-continued

| Name | Channel | Type | Description |
| --- | --- | --- | --- |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
| --- | --- | --- |
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for eMBMS, which may include a multi-cell mode and a single-cell mode. The multi-cell mode may have the following characteristics:

Content for broadcast or multicast services can be transmitted synchronously across multiple cells.

Radio resources for broadcast and multicast services are allocated by an MBMS Coordinating Entity (MCE), which may be logically located above the Node Bs.

Content for broadcast and multicast services is mapped on the MCH at a Node B.

Time division multiplexing (e.g., at sub frame level) of data for broadcast, multicast, and unicast services.

The single-cell mode may have the following characteristics:

Each cell transmits content for broadcast and multicast services without synchronization with other cells.

Radio resources for broadcast and multicast services are allocated by the Node B.

Content for broadcast and multicast services is mapped on the DL-SCH.

Data for broadcast, multicast, and unicast services may be multiplexed in any manner allowed by the structure of the DL-SCH.

In general, eMBMS services may be supported with the multi-cell mode, the single-cell mode, and/or other modes. The multi-cell mode may be used for eMBMS multicast/broadcast single frequency network (MBSFN) transmission, which may allow a UE to combine signals received from multiple cells in order to improve reception performance.

Figure 3:
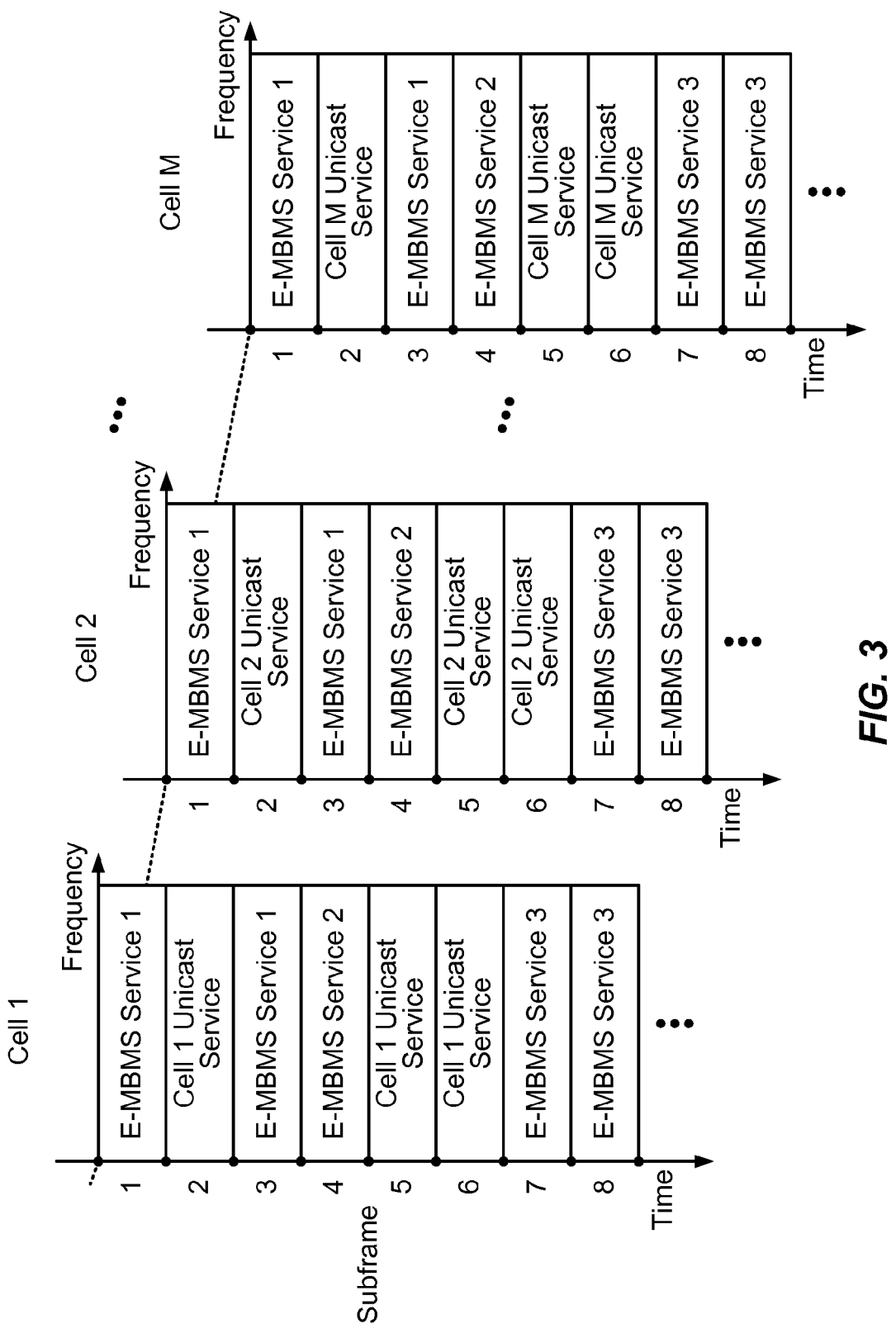
FIG. 3 illustrates example transmissions of different services in a multi-cell mode.

FIG. 3 shows example transmissions of eMBMS and unicast services by M cells 1 through M in the multi-cell mode, where M may be any integer value. For each cell, the horizontal axis may represent time, and the vertical axis may represent frequency. In one design of eMBMS, which is assumed for much of the description below, the transmission time line for each cell may be partitioned into time units of sub frames. In other designs of eMBMS, the transmission time line for each cell may be partitioned into time units of other durations. In general, a time unit may correspond to a sub frame, a slot, a symbol period, multiple symbol periods, multiple slots, multiple sub frames, etc.

In the example shown in FIG. 3, the M cells transmit three eMBMS services 1, 2 and 3. All M cells transmit eMBMS service 1 in sub frames 1 and 3, eMBMS service 2 in sub frame 4, and eMBMS service 3 in sub frames 7 and 8. The M cells transmit the same content for each of the three eMBMS services. Each cell may transmit its own unicast service in sub frames 2, 5 and 6. The M cells may transmit different contents for their unicast services.

Figure 4:
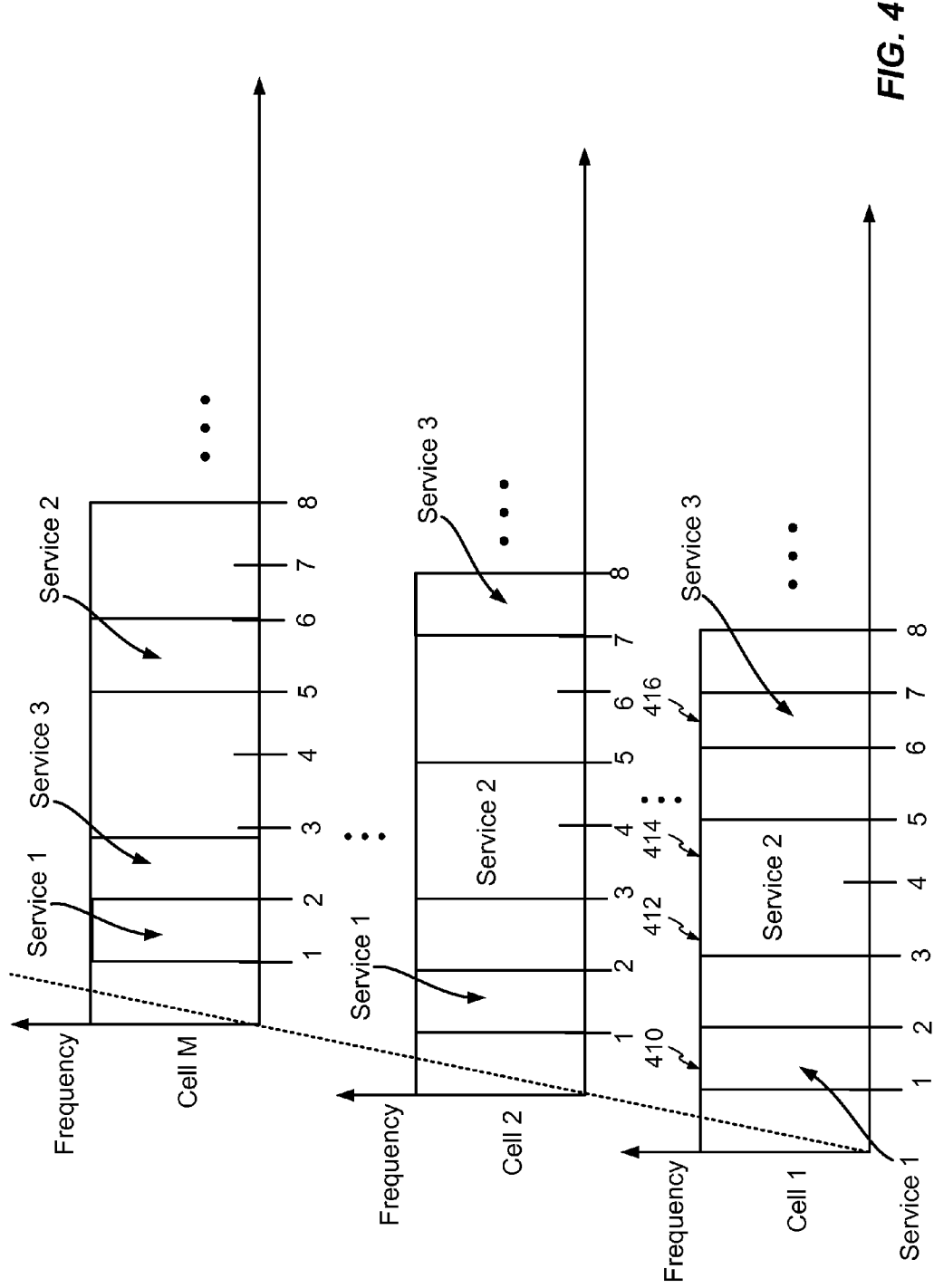
FIG. 4 illustrates example transmissions of different services in a single-cell mode.

FIG. 4 shows example transmissions of eMBMS and unicast services by M cells in the single-cell mode. For each cell, the horizontal axis may represent time, and the vertical axis may represent frequency. In the example shown in FIG. 4, the M cells transmit three eMBMS services 1, 2 and 3. Cell 1 transmits eMBMS service 1 in one time frequency block 410, eMBMS service 2 in a time frequency blocks 412 and 414, and eMBMS service 3 in one time frequency blocks 416. Similarly other cells transmit services 1, 2 and 3 as shown in the FIG. 4.

In general, an eMBMS service may be sent in any number of time frequency blocks. The number of sub frames may be dependent on the amount of data to send and possibly other factors. The M cells may transmit the three eMBMS services 1, 2 and 3 in time frequency blocks that may not be aligned in time and frequency, as shown in FIG. 4. Furthermore, the M cells may transmit the same or different contents for the three eMBMS services. Each cell may transmit its own unicast service in remaining time frequency resources not used for the three eMBMS services. The M cells may transmit different contents for their unicast services.

FIGS. 3 and 4 show example designs of transmitting eMBMS services in the multi-cell mode and the single-cell mode. eMBMS services may also be transmitted in other manners in the multi-cell and single-cell modes, e.g., using time division multiplexing (TDM).

As noted in the foregoing, eMBMS services can be used to distribute multicast data to groups and could be useful in group communication systems (e.g., Push-to-Talk (PTT) calls). Conventional applications on eMBMS have a separate service announcement/discovery mechanism. Further, communications on pre-established eMBMS flows are always on even on the air interface. Power saving optimization must be applied to put the UE to sleep when a call/communication is not in progress. This is typically achieved by using out of band service announcements on unicast or multicast user plane data. Alternatively application layer paging channel like mechanism may be used. Since the application layer paging mechanism has to remain active, it consumes bandwidth on the multicast sub-frame which could be idle in the absence of the paging mechanism. Additionally, since the multicast sub-frame will be active while using the application layer paging, the remainder of the resource blocks within the sub frame cannot be used for unicast traffic. Thus the total 5 Mhz bandwidth will be consumed for the sub frame for instances when application layer paging is scheduled without any other data.

Figure 5A:
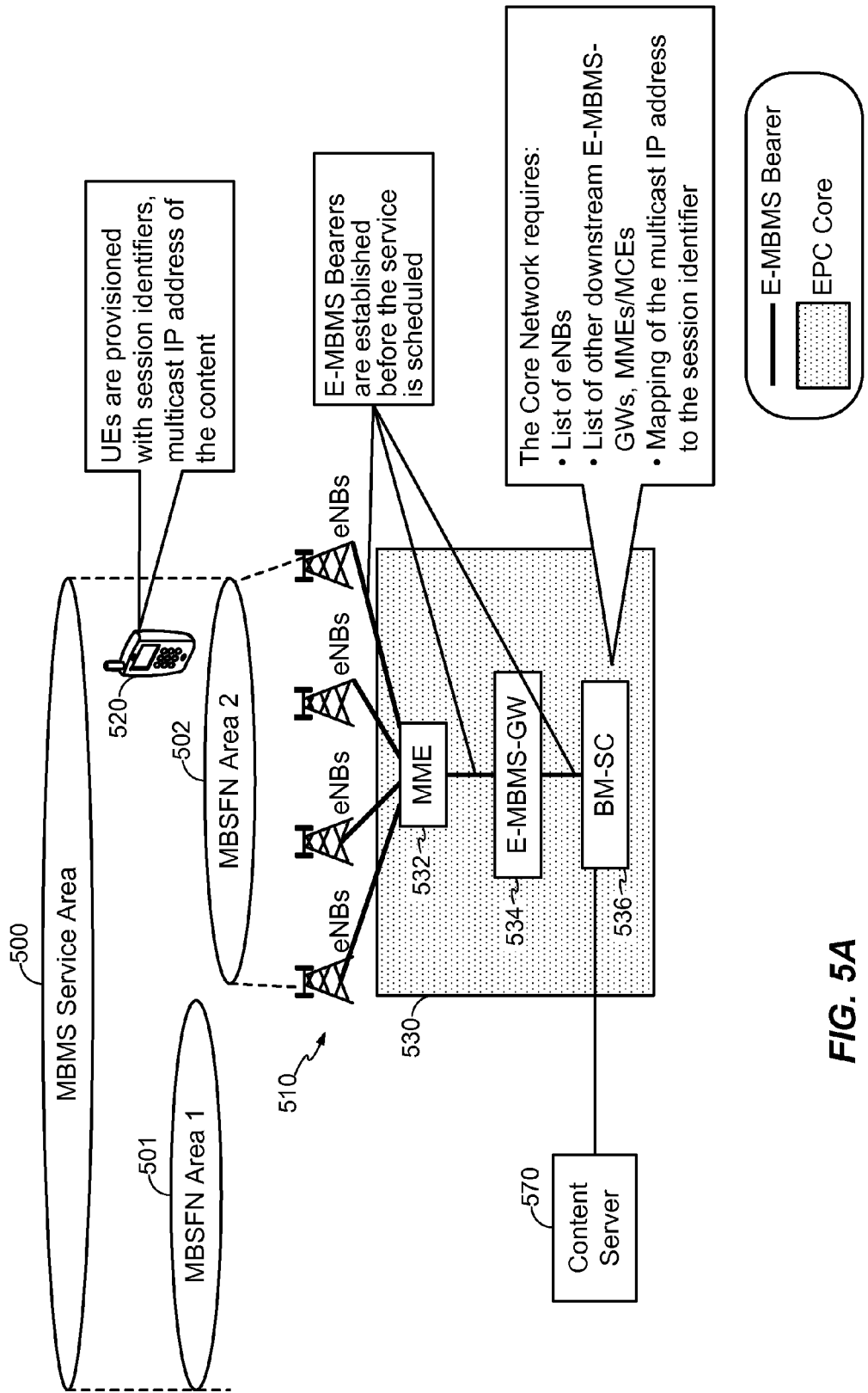
FIGS. 5A and 5B illustrate additional wireless communication systems that can support broadcast/multicast services.

FIG. 5A is another illustration of a wireless network that can implement evolved multimedia broadcast/multicast services (eMBMS) or MBMS services, which are used interchangeably herein. An MBMS service area 500 can include multiple MBSFN areas (e.g. MBSFN area 1, 501 and MBSFN area 2, 502). Each MBSFN area can be supported by one or more eNode Bs 510, which are coupled to a core network 530. Core network 520 can include various elements (e.g., MME 532, eMBMS gateway 534, and broadcast multicast service center (BM-SC) 536 to facilitate controlling and distributing the content from content provider 570 (which may include an application server, etc.) to the MBMS service area 500.

Figure 5B:
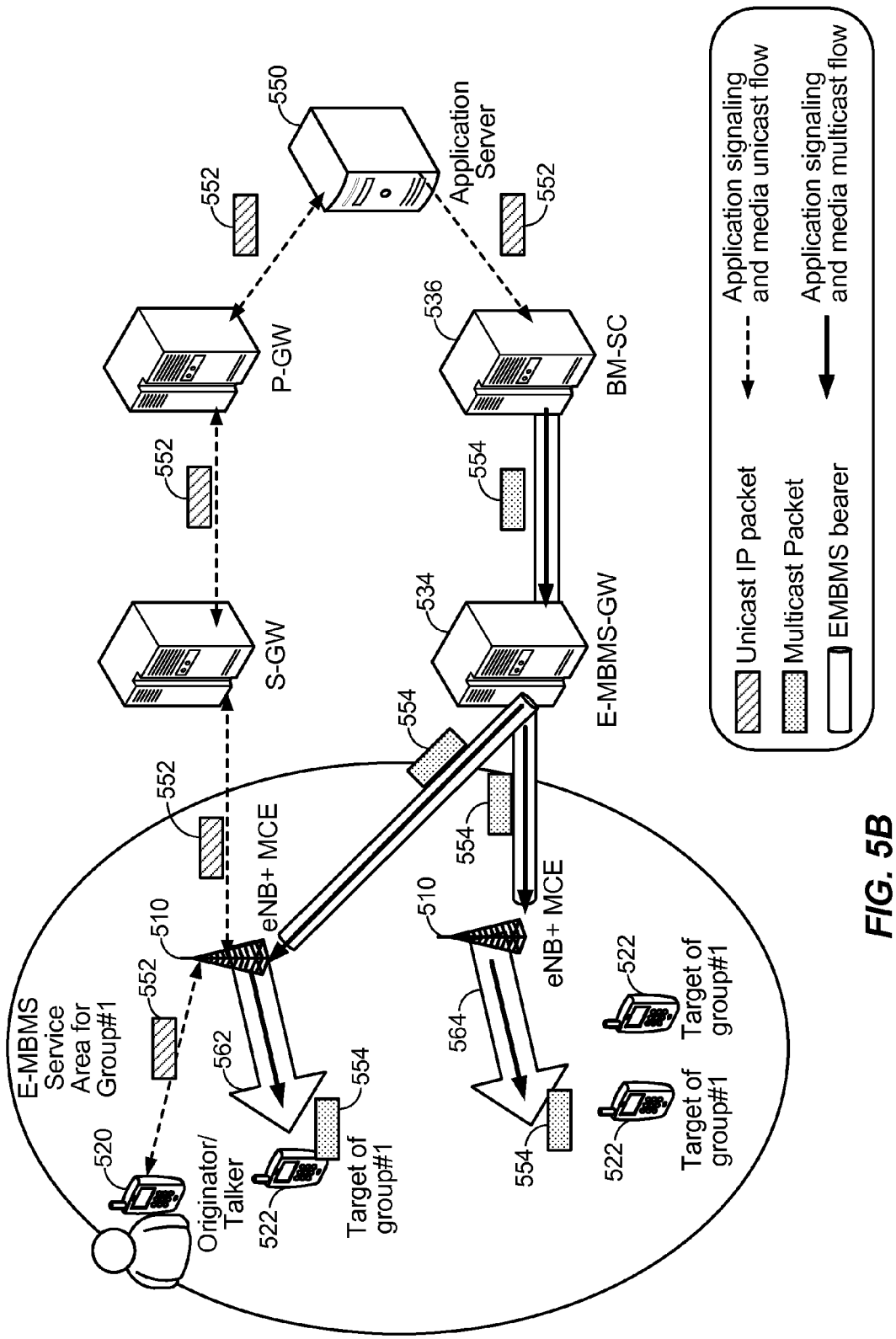

FIG. 5B is another illustration of a wireless network that can implement multimedia broadcast/multicast services (MBMS) as disclosed herein. In the illustrated network an application server 550 (e.g., PTT server) can serve as the content server. The application server 550 can communicate media in unicast packets 552 to the network core where the content can be maintained in a unicast configuration and transmitted as unicast packets to a given UE (e.g., originator/talker 520) or can be converted through the BM-SC to multicast packets 554, which can then be transported target UE's 522. For example, a PTT call can be initiated by UE 520 by communicating with application server 550 via unicast packets 552 over a unicast channel. It will be noted that for the call originator/call talker both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, it will be appreciated in this example, that both the application signaling and media can be communicated over the multicast flow in the downlink or the forward link. Unlike conventional systems, having both the application signaling and the media in the multicast flow, avoids the need of having a separate unicast channel for the application signaling. However, to allow for application signaling over the multicast flow of the illustrated system, an evolved. packet system (EPS) bearer will be established (and persistently on) between the BM-SC 536, EMBS GW 534, eNBs 510 and target UEs 522.

In accordance with various embodiments disclosed herein some of the downlink channels related to eMBMS will be further discussed, which include.

MCCH: Multicast Control Channel;
MTCH: Multicast Traffic Channel;
MCH: Multicast Channel; and
PMCH: Physical Multicast Channel.

It will be appreciated that multiplexing of eMBMS and unicast flows are realized in the time domain only. The MCH is transmitted over MBSFN in specific sub frames on physical layer. MCH is a downlink only channel. A single transport block is used per sub frame. Different services (MTCHs) can be multiplexed in this transport block, as will be illustrated in relation to FIG. 6.

To achieve low latency and reduce control signaling, one eMBMS flow (562, 564) can be activated for each service area. Depending on the data rate, multiple multicast flows can be multiplexed on a single slot. PTT UEs (targets) can ignore and "sleep" between scheduled sub frames and reduce power consumption when no unicast data is scheduled for the UE. The MBSFN sub frame can be shared by groups in the same MBSFN service area. MAC layer signaling can be leveraged to "wake-up" the application layer (e.g., PTT application) for the target UEs.

Embodiments can use two broadcast streams, each a separate eMBMS flow over an LTE broadcast flow, with its own application level broadcast stream and its own (multicast IP address) for each defined broadcast region 502, 501 (e.g., a subset of sectors within the network). Although illustrated as separate regions, it will be appreciated that the broadcast areas 502, 501 may overlap.

In LTE, the control and data traffic for multicast is delivered over MCCH and MTCH, respectively. The Medium Access Control Protocol Data Units (MAC PDUs) for the UEs indicate the mapping of the MTCH and the location of the a particular MTCH within a sub frame. An MCH Scheduling Information (MSI) MAC control element is included in the first subframe allocated to the MCH within the MCH scheduling period to indicate the position of each MTCH and unused subframes on the MCH. For eMBMS user data, which is carried by the MTCH logical channel, MCH scheduling information (MSI) periodically provides at lower layers (e.g., MAC layer information) the information on decoding the MTCH. The MSI scheduling can be configured and according to this embodiment is scheduled prior to MTCH sub-frame interval.

Figure 6:
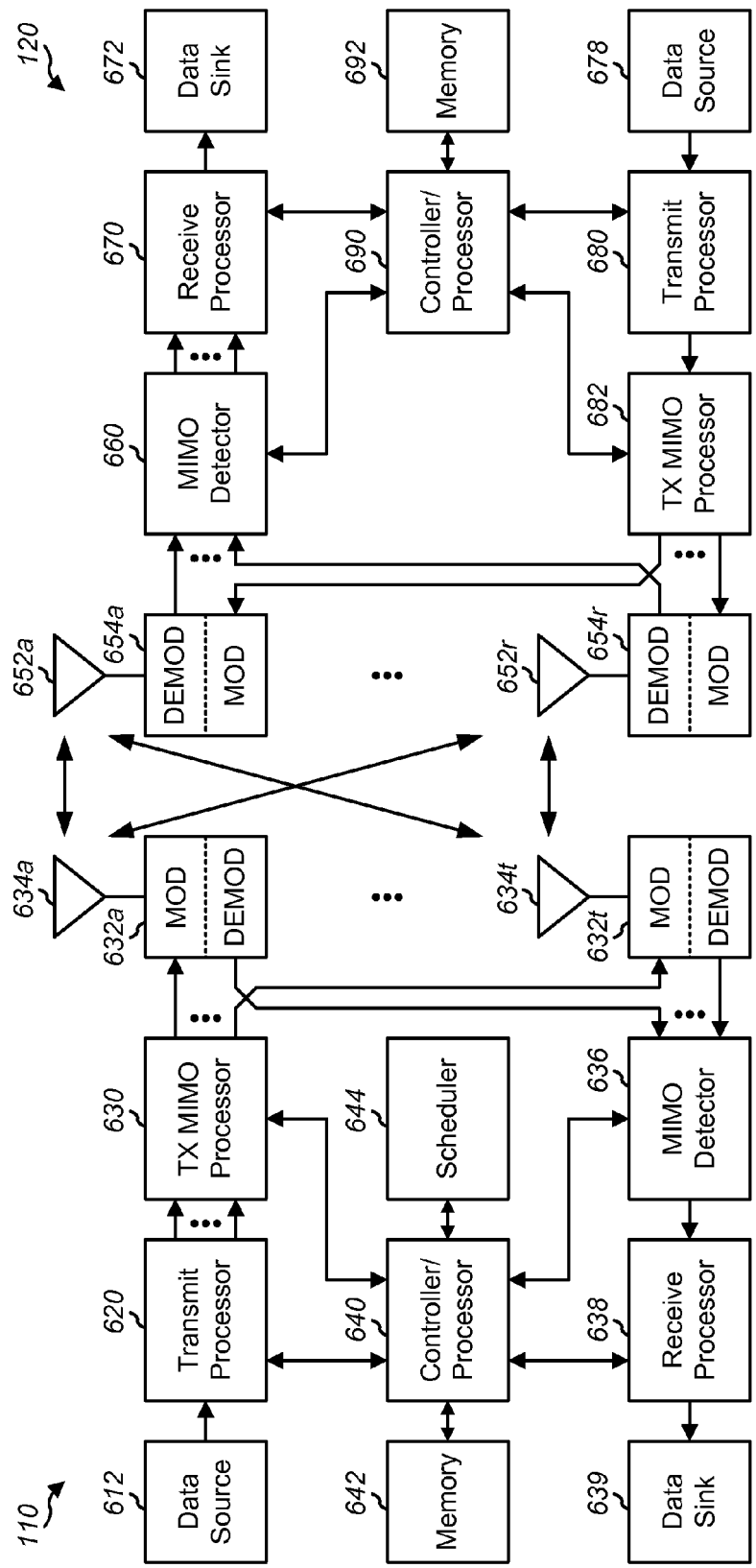
FIG. 6 illustrates a block diagram of a portion of a wireless communication system that can support broadcast/multicast services.

FIG. 6 illustrates a block diagram of a design of an eNode B 110 and UE 120, which may be one of the eNode Bs and one of the UEs discussed herein in relation to the various embodiments. In this design, Node B 110 is equipped with T antennas 634a through 634t, and UE 120 is equipped with R antennas 652a through 652r, where in general T is greater than or equal to 1 and R is greater than or equal to 1.

At Node B 110, a transmit processor 620 may receive data for unicast services and data for broadcast and/or multicast services from a data source 612 (e.g., directly or indirectly from application server 150). Transmit processor 620 may process the data for each service to obtain data symbols. Transmit processor 620 may also receive scheduling information, configuration information, control information, system information and/or other overhead information from a controller/processor 640 and/or a scheduler 644. Transmit processor 620 may process the received overhead information and provide overhead symbols. A transmit (TX) multiple-input multiple-output (MIMO) processor 630 may multiplex the data and overhead symbols with pilot symbols, process (e.g., precode) the multiplexed symbols, and provide T output symbol streams to T modulators (MOD) 632a through 632t. Each modulator 632 may process a respective output symbol stream (e.g., for OFDM) to obtain an output sample stream. Each modulator 632 may further process (e.g., convert to analog, amplify, filter, and upconvert) the output sample stream to obtain a downlink signal. T downlink signals from modulators 632a through 632t may be transmitted via T antennas 634a through 634t, respectively.

At UE 120, antennas 652a through 652r may receive the downlink signals from Node B 110 and provide received signals to demodulators (DEMOD) 654a through 654r, respectively. Each demodulator 654 may condition (e.g., filter, amplify, downconvert, and digitize) a respective received signal to obtain received samples and may further process the received samples (e.g., for OFDM) to obtain received symbols. A MIMO detector 660 may receive and process the received symbols from all R demodulators 654a through 654r and provide detected symbols. A receive processor 670 may process the detected symbols, provide decoded data for UE 120 and/or desired services to a data sink 672, and provide decoded overhead information to a controller/processor 690. In general, the processing by MIMO detector 660 and receive processor 670 is complementary to the processing by TX MIMO processor 630 and transmit processor 620 at Node B 110.

On the uplink, at UE 120, data from a data source 678 and overhead information from a controller/processor 690 may be processed by a transmit processor 680, further processed by a TX MIMO processor 682 (if applicable), conditioned by modulators 654a through 654r, and transmitted via antennas 652a through 652r. At Node B 110, the uplink signals from UE 120 may be received by antennas 634, conditioned by demodulators 632, detected by a MIMO detector 636, and processed by a receive processor 638 to obtain the data and overhead information transmitted by UE 120.

Controllers/processors 640 and 690 may direct the operation at Node B 110 and UE 120, respectively. Scheduler 644 may schedule UEs for downlink and/or uplink transmission, schedule transmission of broadcast and multicast services, and provide assignments of radio resources for the scheduled UEs and services. Controller/processor 640 and/or scheduler 644 may generate scheduling information and/or other overhead information for the broadcast and multicast services.

Controller/processor 690 may implement processes for the techniques described herein. Memories 642 and 692 may store data and program codes for Node B 110 and UE 120, respectively. Details of the various logic elements are provided in the following description. Accordingly, group communications in the eMBMS environment can be accomplished in accordance with the various embodiments disclosed herein, while still remaining compliant with the existing standards.

By implementing application layer logic, the access resources and the reverse link resource utilization can be minimized or reduced by staggering the access channel usage for UEs participating in PTT/group communications in an MBSFN area. The UEs can implement an access channel back-off probability based on the number of users in the group and/or a time weighted average of the presence of the UEs in the MBSFN area. This results in a random distribution of access back-off delays. When the call announcement arrives for the group communication, a UE with lower access back-off delay will respond to the announcement. The application server can then send a message to notify other UEs in the group waiting to send their ACKs to suppress the ACKs.

For the first call each UE can select a random time to delay its response to the first call announce. Each UE can then respond based on the random delay time. After the first call, each UE can track the time they are present in the multicast area and adjust delay time based on the total elapsed time the UE is in the multicast area.

Figure 7:
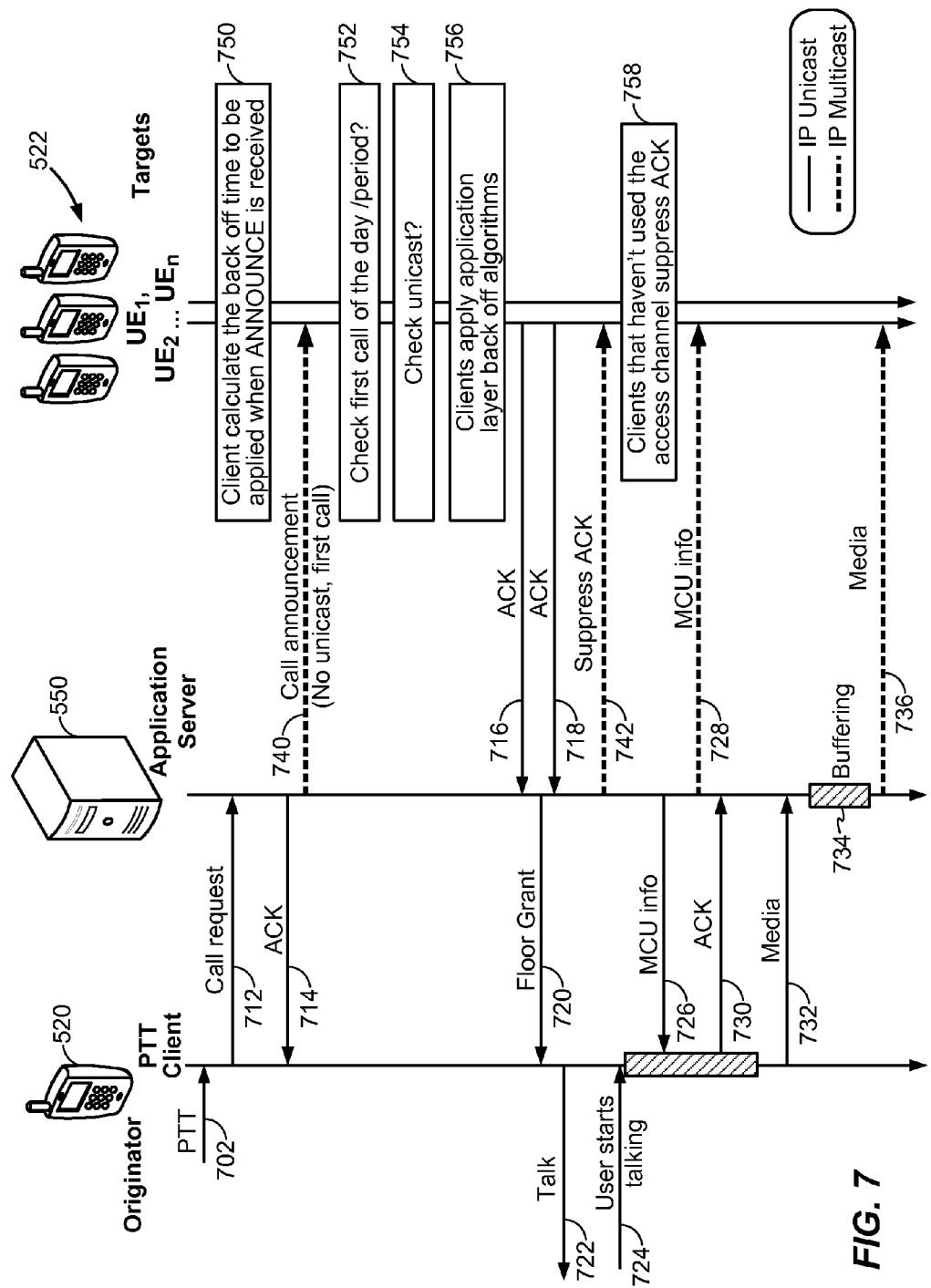
FIG. 7 illustrates a system level diagram with various call flows and signaling between the various system components.

FIG. 7 illustrates a system level diagram with various call flows and signaling between the various system components. As illustrated, generally elements 710-736 represent conventional actions, so a detailed discussion of the various aspects of setting up a group call will not be discussed in detail herein. To initiate the group call, an originator UE 520 may request a group call by signaling an application server 550 (see, e.g., 710-714). The application server 550 can then send a call announce 740 to the various target UEs 522. The call announce 740 may be a conventional call announce or may contain additional indicators such as whether there are unicast targets, if it is the first call of a given period (e.g., first call of the day, etc.) that can be utilized by the target UEs 522. For example, at the start of a given period, the target UEs may use a previously calculated random back-off time (block 750) to respond to the call announce. If a conventional call announce is sent, the target UEs 522 can determine the start of the period on their own. However, if there is an indicator set in the announce message the target UEs 522 use the previously established back-off time regardless of their own determination. In essence the indicator can be used as reset from the application server. Likewise, if the call announce includes an indicator that there are unicast targets, then the back-off time can be delayed for an additional offset time. These aspects will be discussed in greater detail in the following.

After receiving the call announce, the target UEs respond with an acknowledgement message (ACK) of a reverse link according to the various embodiments discussed herein. For example, at least one target UE will respond with an ACK 716 that allows the application server to grant the floor, indicate the floor grant to the originator which can begin talking and establish and conduct the group call (see, e.g., 720-736). As noted above, these aspects are known, so they will not be discussed in detail.

However, in addition to ACK 716, extraneous ACKs, such as ACK 718 may be received. To avoid receiving these extraneous ACKs from multiple target UEs 522, the application server can send an ACK suppression message 742 to the target UEs 522.

The target UEs can each implement various logic to control the response to call announce messages according to various embodiments disclosed herein. For example, in block 750, each target UE 522 can calculate a back-off time to be applied when the announce message 740 is received. In block 752, each target UE 522 can check for an indicator of a first call of the day or first call of a defined period. This may be done solely at the target UE 522 and/or may also be included in the announce message 740, as discussed above. In block 754, each target UE can check the announce message 740 to see if there is an indicator that there are unicast targets, which may optionally be included in announce message 740. In block 756, each target UE 522 can apply the application layer back-off logic to determine their respective response to the call announce message, based on the factors discussed herein (e.g., first call, unicast targets, etc.). These factors and responses will be discussed further following description. In block 758, if the suppression message is received from the application server 550, the target UEs 522 that haven't used the access channel to ACK the announce message 740, can suppress their ACK thereby conserving reverse link resources.

As discussed above embodiments can include an application layer mechanism for congestion reduction. The PTT multicast UEs (e.g., 520, 522) can pick a number based on the proposed algorithm to initiate access procedures to send access probes. The number corresponds to the number of milliseconds the UEs need to wait after the call announcement is received before the access procedures can start. The number selection algorithm has two approaches, one for the first call of a given period (e.g., one day) and the second for all subsequent calls for the given period (for ease of explanation the period will be referred to as a day, but the various embodiments are not limited to this time period). For example, using a day as the period, the number selection logic resets at midnight.

Additionally, to avoid using resources, once the application server sends an ACK suppression message, UEs that have not ACKed will suppress their access procedures for the ACK. Therefore, the reverse link resources will be preserved.

Figure 8:
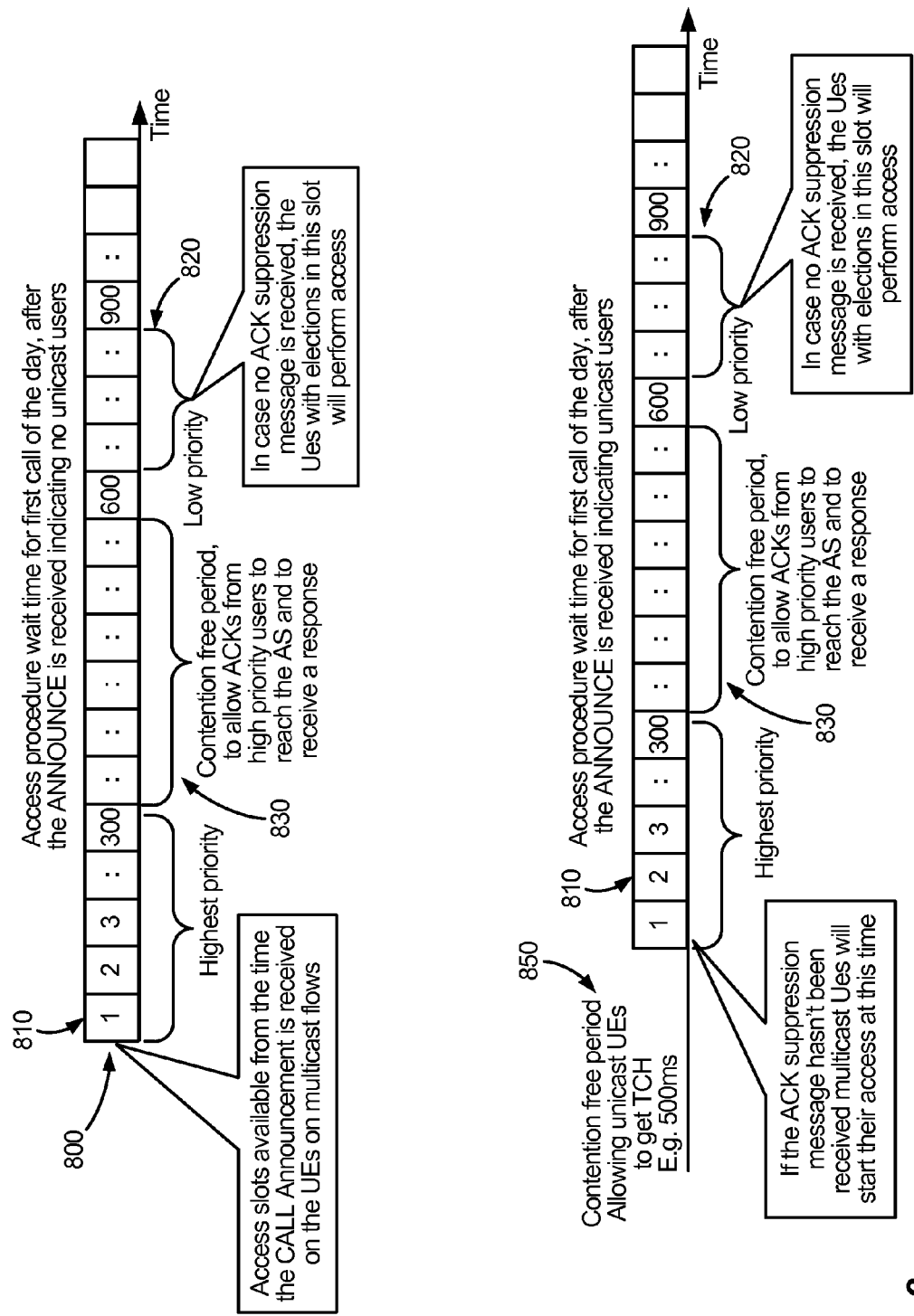
FIG. 8 illustrates a first congestion avoidance scheme.
Figure 9:
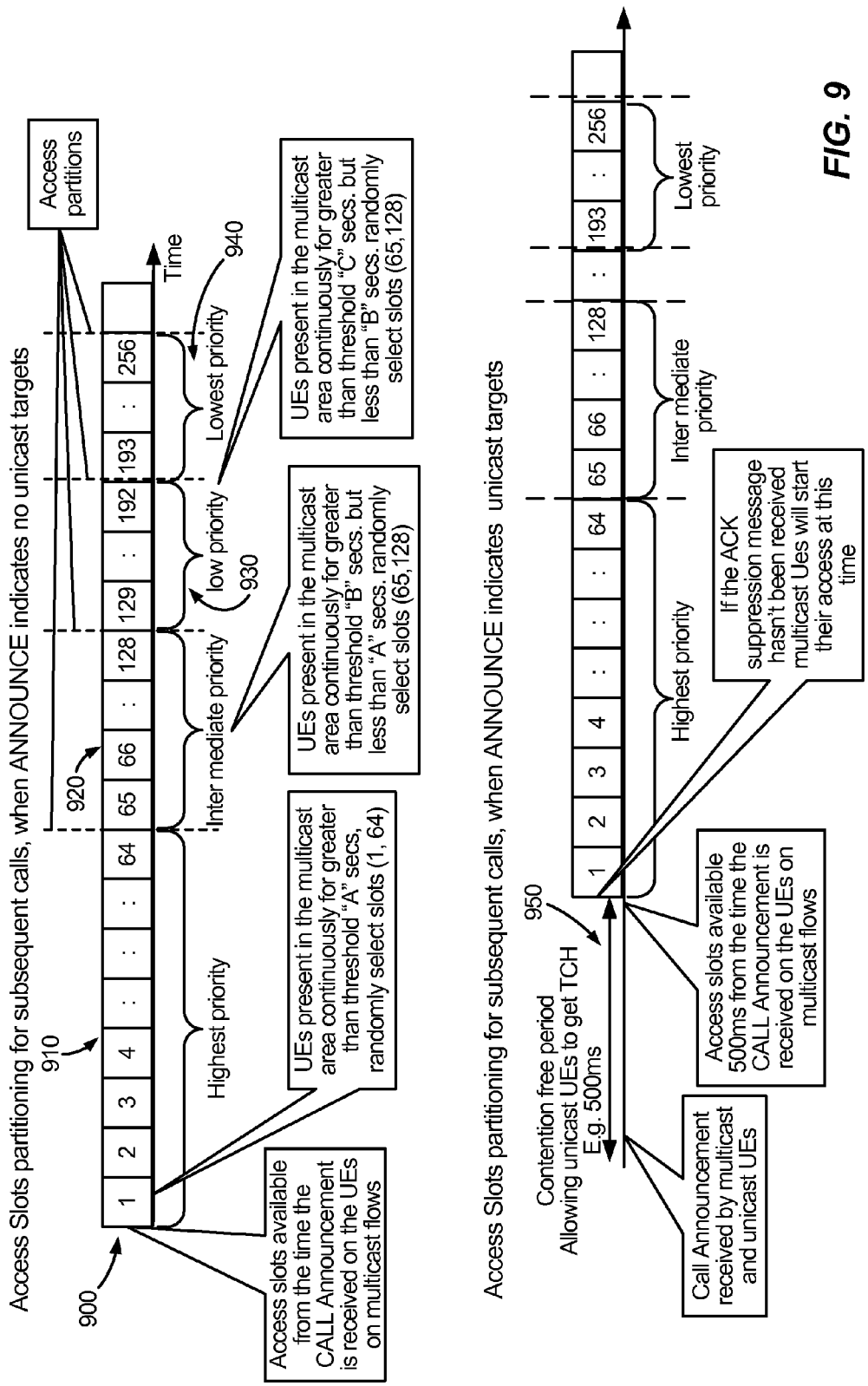
FIG. 9 illustrates a second congestion avoidance scheme.

As discussed, the congestion avoidance logic has two parts. FIG. 8 illustrates a first algorithm for the first call of the day. FIG. 9 illustrates the second algorithm for all subsequent calls for the day.

Referring to FIG. 8, the first algorithm 800 assigns random access priorities (wait times) in two partitions, 810 and 820.

For example, the first partition 810 of 0 to 300 ms and a second partition 820 that adds an additional wait of 600 to 1000 ms. No access procedures are allowed between 301 to 599 ms, which is a contention free period 830, after the announce is received to ensure that the ACKs that were sent in the first partition 810, between 1 to 300 ms, from the time the announce was received have a chance to reach the application server and seek a response from the application server to trigger ACK suppression. The first algorithm/logic (800) is only applied to the first call every day (or period). Moreover when the announce message indicates a presence of unicast targets, the UE add a predetermined fixed back-off to the existing back-off calculated at each UE. This is done to allow the unicast UE to access the common channel and establish their traffic channels. This process further reduces the overhead of unicast traffic channels used by the multicast UE. For example, if the UE picks a random number (1, 1000) for its slot and assigns this as X ms back-off. If the number falls between (301, 599), the UE picks a random number between (600, 1000). The UE waits for X ms after the announce is received before performing access, where X ms=the random slot picked above. When the announce message indicates unicast targets in call, the UE adds 500 ms to its slot calculation, 850.

FIG. 9 illustrates a second algorithm/logic 900 that is used to apply a time bias to the random selection of slots for the UEs. The target UEs present in the multicast area get the higher priority (less wait time for access), where as the clients that move in and out of coverage get lower priority. In the first algorithm, if the initial slots are assigned to UEs that are outside the coverage area, during those slots no UEs perform access and hence will contribute to latency. Time bias is can be used to avoid this drawback. However, in the first call of the day where all users may have just entered the MBSFN area, the time bias would put most users in the back of the time slot, so the first algorithm based on random number is used for the first call.

Referring to FIG. 9, the number of access slots can be divided into multiple partitions based on the number of group members, slot duration, etc. For example, the number of access partitions can be found for 64 ms=>Number of member in group/16. The start a time can be logged when the multicast area is entered by the UE and the elapsed time can be monitored. The elapsed time can be divided into multiple thresholds (e.g., 15 minutes per partition over 16 partitions, each part so after 4 hours the UE is assigned to partition 1). Depending on the time threshold UE picks a partition, e.g., 910, 920, 930, or 940 with the UEs having the highest elapsed time in the multicast service area being assigned to lower numbered partitions. Accordingly, a UE with an elapsed time of 4 hours may be in partition 1, 910. Another UE with an elapsed time of 3:45 may be in partition 2, 920 and so on. Once a partition is picked UE picks the random slot in the partition (e.g., if the UE is in the multicast area for 4 hours it picks slots in partition 1, 910). When the announce message arrives, the UE can wait until the random slot selected is reached (i.e., delaying an ACK for a determined number of ms based on the slot selected). If no ACK suppression message was received, the UE performs its access procedure to send an ACK (e.g., if the UE is in the multicast area for 4 hours it picks a random slot 10, in partition 1 and wait 10 ms after the announce before starting access procedures). When the announce message indicates there are unicast targets in call, the UE adds 500 ms to its slot calculation, thereby creating an offset delay, 950. This time represents the round trip time required for the unicast UE's to deliver the ACK response and the application server's processing time.

In some embodiments, immediately after the first call, an algorithm may be employed to randomly distribute some or all of the UEs across the various partitions to increase the probability that there is at least one UE in partition 1 (the highest priority), which would reduce the latency for acknowledgement, as opposed to having all UEs in the last partition (the lowest priority). Further, it will be appreciated that there may be some embodiments where a network entity, such as the application server, sends a reset to some or all of the UEs to force a restarting of the timers, so that not all UEs get crowded into partition 1 based on accumulated priorities from the previous periods. Optionally, after the reset, some or all of the UEs may be randomly distributed across the various partitions to increase the probability that there is at least one UE in partition 1 (the highest priority), as discussed earlier.

In an embodiment, the second priority is determined by starting a timer when the UE enters the multicast area to determine the elapsed time. The elapsed time is then divided into multiple thresholds. A delay time partition is selected based on each threshold exceeded, and a second random time is selected within the delay partition. Each threshold exceeded increases a priority of a respective UE. As the elapsed time increases, the second random time is determined as a random slot within the delay partition. The timer is suspended for short durations when the UE may be out of the multicast area.

It will be appreciated that the specific sequence of actions and values used (e.g., 500 ms for the offset delay) are provided solely for illustration and not as limitations of the various embodiments. Accordingly, embodiments of the invention may use any offset delay value, number of partition, or variations of any other variables discussed above.

Figure 10:
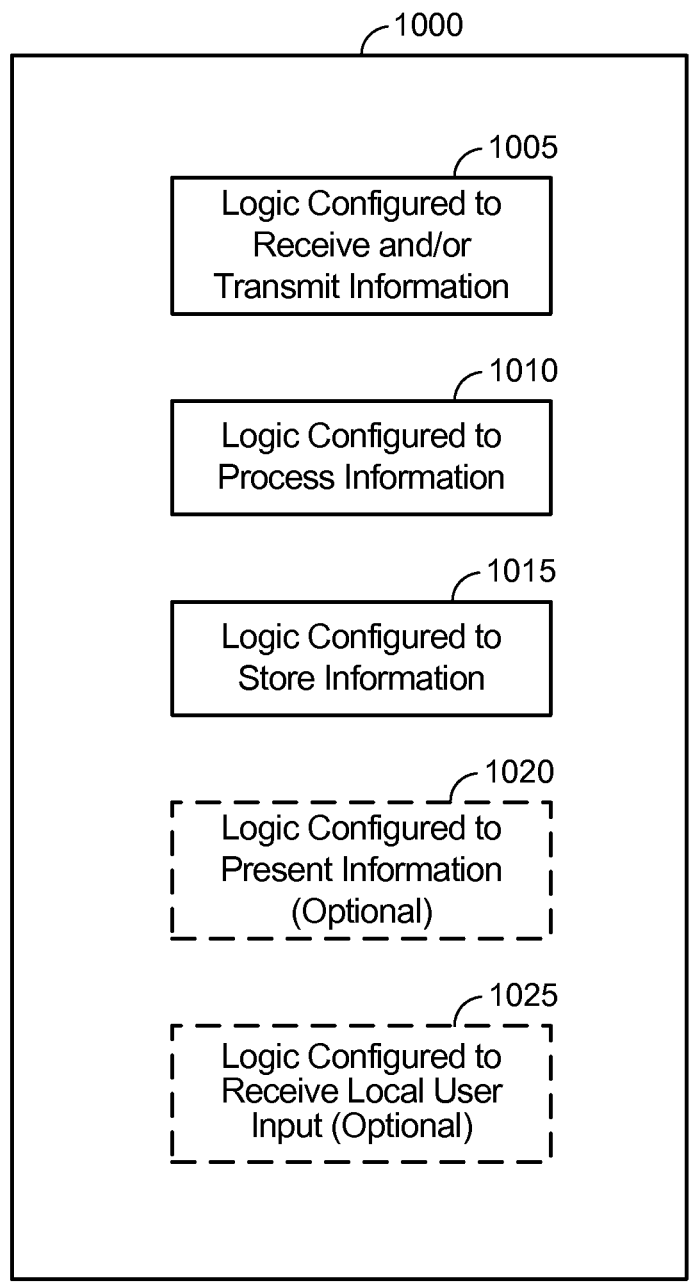
FIG. 10 illustrates a communication device that includes logic configured to receive and/or transmit information.

FIG. 10 illustrates a communication device 1000 that includes logic configured to perform functionality. The communication device 1000 can correspond to any of the above-noted communication devices, including but not limited to Node Bs 110 or 510, UEs 120 or 520, the application server 150, the network controller 130, the BM-SC 536, the content server 570, MME 532, E-MBMS-GW 532, etc. Thus, communication device 1000 can correspond to any electronic device that is configured to communicate with (or facilitate communication with) one or more other entities over a network.

Referring to FIG. 10, the communication device 1000 includes logic configured to receive and/or transmit information 1005. In an example, if the communication device 1000 corresponds to a wireless communications device (e.g., UE 120, Node B 110, etc.), the logic configured to receive and/or transmit information 1005 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 1005 can correspond to a wired communications interface (e.g., a serial connection, a USB or Firewire connection, an Ethernet connection through which the Internet can be accessed, etc.). Thus, if the communication device 1000 corresponds to some type of network-based server (e.g., the application server 150, the network controller 130, the BM-SC 536, the content server 570, MME 532, E-MBMS-GW 532, etc.), the logic configured to receive and/or transmit information 1005 can correspond to an Ethernet card, in an example, that connects the network-based server to other communication entities via an Ethernet protocol. In a further example, the logic configured to receive and/or transmit information 1005 can include sensory or measurement hardware by which the communication device 1000 can monitor its local environment (e.g., an accelerometer, a temperature sensor, a light sensor, an antenna for monitoring local RF signals, etc.). The logic configured to receive and/or transmit information 1005 can also include software that, when executed, permits the associated hardware of the logic configured to receive and/or transmit information 1005 to perform its reception and/or transmission function(s). However, the logic configured to receive and/or transmit information 1005 does not correspond to software alone, and the logic configured to receive and/or transmit information 1005 relies at least in part upon hardware to achieve its functionality.

Referring to FIG. 10, the communication device 1000 further includes logic configured to process information 1010. In an example, the logic configured to process information 1010 can include at least a processor. Example implementations of the type of processing that can be performed by the logic configured to process information 1010 includes but is not limited to performing determinations, establishing connections, making selections between different information options, performing evaluations related to data, interacting with sensors coupled to the communication device 1000 to perform measurement operations, converting information from one format to another (e.g., between different protocols such as .wmv to .avi, etc.), and so on. For example, the processor included in the logic configured to process information 1010 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1010 can also include software that, when executed, permits the associated hardware of the logic configured to process information 1010 to perform its processing function(s). However, the logic configured to process information 1010 does not correspond to software alone, and the logic configured to process information 1010 relies at least in part upon hardware to achieve its functionality.

Referring to FIG. 10, the communication device 1000 further includes logic configured to store information 1015. In an example, the logic configured to store information 1015 can include at least a non-transitory memory and associated hardware (e.g., a memory controller, etc.). For example, the non-transitory memory included in the logic configured to store information 1015 can correspond to random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. The logic configured to store information 1015 can also include software that, when executed, permits the associated hardware of the logic configured to store information 1015 to perform its storage function(s). However, the logic configured to store information 1015 does not correspond to software alone, and the logic configured to store information 1015 relies at least in part upon hardware to achieve its functionality.

Referring to FIG. 10, the communication device 1000 further optionally includes logic configured to present information 1020. In an example, the logic configured to display information 1020 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1000. For example, if the communication device 1000 corresponds to UE 120 or 520, the logic configured to present information 1020 can include a display screen and an audio output device (e.g., speakers). In a further example, the logic configured to present information 1020 can be omitted for certain communication devices, such as network communication devices that do not have a local user (e.g., network switches or routers, remote servers, etc.). The logic configured to present information 1020 can also include software that, when executed, permits the associated hardware of the logic configured to present information 1020 to perform its presentation function(s). However, the logic configured to present information 1020 does not correspond to software alone, and the logic configured to present information 1020 relies at least in part upon hardware to achieve its functionality.

Referring to FIG. 10, the communication device 1000 further optionally includes logic configured to receive local user input 1025. In an example, the logic configured to receive local user input 1025 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 1000. For example, if the communication device 1000 corresponds to UE 120 or 520, the logic configured to receive local user input 1025 can include a display screen (if implemented a touch-screen), a keypad, etc. In a further example, the logic configured to receive local user input 1025 can be omitted for certain communication devices, such as network communication devices that do not have a local user (e.g., network switches or routers, remote servers, etc.). The logic configured to receive local user input 1025 can also include software that, when executed, permits the associated hardware of the logic configured to receive local user input 1025 to perform its input reception function(s). However, the logic configured to receive local user input 1025 does not correspond to software alone, and the logic configured to receive local user input 1025 relies at least in part upon hardware to achieve its functionality.

Referring to FIG. 10, while the configured logics of 1005 through 1025 are shown as separate or distinct blocks in FIG. 10, it will be appreciated that the hardware and/or software by which the respective configured logic performs its functionality can overlap in part. For example, any software used to facilitate the functionality of the configured logics of 1005 through 1025 can be stored in the non-transitory memory associated with the logic configured to store information 1015, such that the configured logics of 1005 through 1025 each performs their functionality (i.e., in this case, software execution) based in part upon the operation of software stored by the logic configured to store information 1005. Likewise, hardware that is directly associated with one of the configured logics can be borrowed or used by other configured logics from time to time. For example, the processor of the logic configured to process information 1010 can format data into an appropriate format before being transmitted by the logic configured to receive and/or transmit information 1005, such that the logic configured to receive and/or transmit information 1005 performs its functionality (i.e., in this case, transmission of data) based in part upon the operation of hardware (i.e., the processor) associated with the logic configured to process information 1010. Further, the configured logics or "logic configured to" of 1005 through 1025 are not limited to specific logic gates or elements, but generally refer to the ability to perform the functionality describe herein (either via hardware or a combination of hardware and software). Thus, the configured logics or "logic configured to" of 1005 through 1025 are not necessarily implemented as logic gates or logic elements despite sharing the word "logic". Other interactions or cooperation between the configured logics 1005 through 1025 will become clear to one of ordinary skill in the art from a review of the embodiments described below in more detail.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for group communications over evolved multimedia broadcast/multicast services (eMBMS). Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for prioritizing call announce response in a broadcast/multicast communication system comprising:
    establishing a first priority for response based on assigning to a user equipment (UE) a first random delay for response to a first call announce;
    responding to the first call announce using the first random delay; and
    determining a second priority for response to a subsequent call announce based on an elapsed time that the UE is present in a multicast area wherein the elapsed time is determined by starting a timer when the UE enters the multicast area.

2. The method of claim 1, wherein the first priority is assigned in two partitions each having a range of delay, the partitions including a first partition and a second partition.

3. The method of claim 2, wherein the first partition has a range of delay of 0 ms to 300 ms and the second partition has a range of delay of 600 ms to 1000 ms, and wherein the UE is assigned to a random time within one of the two partitions.

4. The method of claim 1, wherein the first priority is determined after receiving a reset signal from an application server.

5. The method of claim 1, wherein determining the second priority further comprises:
    dividing the elapsed time into multiple thresholds;
    selecting a delay time partition based on each threshold exceeded; and
    selecting a second random time within the delay time partition.

6. The method of claim 5, wherein the second random time is determined as a random slot within the delay time partition.

7. The method of claim 5, wherein the delay time partition is reduced as the elapsed time is increased.

8. The method of claim 5, wherein the timer is suspended for short durations when the UE may be out of the multicast area.

9. The method of claim 5, wherein each threshold exceeded increases the second priority of the UE.

10. The method of claim 1, further comprising:
    delaying the first random delay for response for an offset delay if there is an indication of a unicast target receiving the first call announce.

11. The method of claim 10, wherein the offset delay is a time taken for one round trip unicast message delivery.

12. The method of claim 11, wherein the offset delay is 500 ms.

13. The method of claim 10, wherein the indication the unicast target is provided only after a threshold number of unicast targets is predicted.

14. The method of claim 10, wherein the indication of the unicast target is provided based on a probability of at least one unicast target responding.

15. The method of claim 1, further comprising:
    receiving an acknowledgement that a first response to the first call announce has been received; and
    not responding after receiving the acknowledgment.

16. An apparatus for prioritizing call announce response in a broadcast/multicast communication system comprising:
    logic configured to establish a first priority for response based on assigning each to a user equipment (UE) a first random delay for response to a first call announce;
    logic configured to respond to the first call announce using the first random delay; and
    logic configured to determine a second priority for response to a subsequent call announce based on an elapsed time that the UE is present in a multicast area, wherein the elapsed time is determined by starting a timer when the UE enters the multicast area.

17. The apparatus of claim 16, wherein the first priority is assigned in two partitions each having a range of delay, the partitions including a first partition and a second partition.

18. The apparatus of claim 17, wherein the first partition has a range of delay of 0 ms to 300 ms and the second partition has a range of delay of 600 ms to 1000 ms and wherein the UE is assigned to a random time within one of the two partitions.

19. The apparatus of claim 16, wherein the first priority is determined after receiving a reset signal from an application server.

20. The apparatus of claim 16, wherein the logic configured to determine the second priority further comprises:
  logic configured to divide the elapsed time into multiple thresholds;
  logic configured to select a delay time partition based on each threshold exceeded; and
  logic configured to select a second random time within the delay time partition.

21. The apparatus of claim 20, wherein the second random time is determined as a random slot within the delay time partition.

22. The apparatus of claim 20, wherein the delay time partition is reduced as the elapsed time is increased.

23. The apparatus of claim 20, wherein the timer is suspended for short durations when the UE may be out of the multicast area.

24. The apparatus of claim 20, wherein each threshold exceeded increases the second priority of the UE.

25. The apparatus of claim 16, further comprising:
  logic configured to delay the first random delay for response for an offset delay if there is an indication of a unicast target receiving the first call announce.

26. The apparatus of claim 25, wherein the offset delay is a time taken for one round trip unicast message delivery.

27. The apparatus of claim 26, wherein the offset delay is 500 ms.

28. The apparatus of claim 25, wherein the indication the unicast target is provided only after a threshold number of unicast targets is predicted.

29. The apparatus of claim 25, wherein the indication of the unicast target is provided based on a probability of at least one unicast target responding.

30. The apparatus of claim 16, further comprising:
  logic configured to receive an acknowledgement that a first response to the first call announce has been received; and
  logic configured to not respond after receiving the acknowledgment.

31. An apparatus for prioritizing call announce response in a broadcast/multicast communication system comprising:
  means for establishing a first priority for response based on assigning to a user equipment (UE) a first random delay for response to a first call announce;
  means for responding to the first call announce using the first random delay; and
  means for determining a second priority for response to a subsequent call announce based on an elapsed time that the UE is present in a multicast area, wherein the elapsed time is determined by starting a timer when the UE enters the multicast area.

32. A non-transitory computer-readable medium for prioritizing call announce response in a broadcast/multicast communication system comprising:
  at least one instruction to establish a first priority for response based on assigning to a user equipment (UE) a first random delay for response to a first call announce;
  at least one instruction to respond to the first call announce using the first random delay; and
  at least one instruction to determine a second priority for response to a subsequent call announce based on an elapsed time that the UE is present in a multicast area, wherein the elapsed time is determined by starting a timer when the UE enters the multicast area.

* * * * *